(12) United States Patent
Li et al.

(10) Patent No.: US 11,463,609 B2
(45) Date of Patent: Oct. 4, 2022

(54) CAMERA DEVICE FOR COLLECTING VEHICLE INFORMATION

(71) Applicant: Hangzhou Hikvision Digital Technology Co., Ltd., Hangzhou (CN)

(72) Inventors: Yang Li, Hangzhou (CN); Caisheng Yan, Hangzhou (CN); Zhan Ye, Hangzhou (CN); Wenxue Wang, Hangzhou (CN); Zhenhua Zhou, Hangzhou (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/684,590

(22) Filed: Mar. 2, 2022

(65) Prior Publication Data

US 2022/0191355 A1 Jun. 16, 2022

Related U.S. Application Data

(63) Continuation of application No. PCT/CN2020/113846, filed on Sep. 7, 2020.

(30) Foreign Application Priority Data

Sep. 6, 2019 (CN) .......................... 201910842808.7

(51) Int. Cl.
    *H04N 5/225* (2006.01)
(52) U.S. Cl.
    CPC ......... *H04N 5/2252* (2013.01); *H04N 5/2254* (2013.01); *H04N 5/2256* (2013.01)
(58) Field of Classification Search
    CPC .................................................. H04N 5/2252
    (Continued)

(56) References Cited

U.S. PATENT DOCUMENTS 10,368,036 B2 * 7/2019 Liu .......................... G08G 1/04
2014/0257942 A1 9/2014 Nerayoff et al.

FOREIGN PATENT DOCUMENTS

| CN | 101253540 A | 8/2008 |
| CN | 102156863 A | 8/2011 |
(Continued)

OTHER PUBLICATIONS

Lu, Bo, et al. "Analysis and Design of Intelligent Parking Charge Management System," Microcomputer Applications vol. 30, No. 5, May 30, 2014.

*Primary Examiner* — Joel W Fosselman
(74) *Attorney, Agent, or Firm* — Meunier Carlin & Curfman, LLC

(57) ABSTRACT

The present application discloses a camera device for collecting vehicle information. In the present application, the camera device uses a dual-lens configuration including a first camera assembly and a second camera assembly, wherein the lens field of view of the first camera assembly intersects with the lens field of view of the second camera assembly, so as to form a layout mode that two areas on both sides of the camera device are photographed in a staggered manner, thereby avoiding the occurrence of a blind area between the lens fields of view of the first camera assembly and the second camera assembly and improving the overall photographing range of the camera device. Moreover, the camera device may introduce at least one auxiliary function such as photosensitive detection, light supplementing, and target detection, so as to improve the quality of image photographing and the accuracy of photographing moment, thereby facilitating improving the accuracy of vehicle information collection. In addition, the camera device is powered by an exchangeable dry battery module, and can also support (Continued)

antenna-based wireless transmission, thereby omitting cable connection and network wiring.

12 Claims, 9 Drawing Sheets

(58) Field of Classification Search
USPC .......................................................... 348/373
See application file for complete search history.

(56) References Cited

FOREIGN PATENT DOCUMENTS

| | | |
|---|---|---|
| CN | 105844719 A | 8/2016 |
| CN | 106373405 A | 2/2017 |
| CN | 107079088 A | 8/2017 |
| CN | 206602571 U | 10/2017 |
| CN | 108091163 A | 5/2018 |
| CN | 109983518 A | 5/2018 |
| CN | 207328189 U | 5/2018 |
| CN | 108513107 A | 9/2018 |
| CN | 108615397 A | 10/2018 |
| CN | 108683828 A | 10/2018 |
| CN | 207942981 U | 10/2018 |
| CN | 208094685 U | 11/2018 |
| CN | 208477733 U | 2/2019 |
| CN | 209017195 U | 6/2019 |
| CN | 210924908 U | 7/2020 |

\* cited by examiner

CAMERA DEVICE FOR COLLECTING VEHICLE INFORMATION

This is a continuation application of International Patent Application No. PCT/CN2020/113846, filed on Sep. 7, 2020, which claims the priority to a Chinese Patent Application No. 201910842808.7, filed with the China National Intellectual Property Administration on Sep. 6, 2019 and entitled "Camera device for collecting vehicle information." The disclosures of these applications are incorporated herein by reference in their entireties.

TECHNICAL FIELD

The present application relates to camera technology, in particular to a camera device for collecting vehicle information.

BACKGROUND

The traditional charging method for parking spaces is manual charging. The prior art aims to develop automatic charging schemes to replace the traditional manual charging method.

The automatic charging is based on the collection of vehicle information. Therefore, how to support the information collection of vehicles parked in parking spaces has become the primary technical problem to be solved in the prior art.

SUMMARY

An embodiment of the present application provides a camera device for collecting vehicle information, which comprises:

a housing having a first element compartment and a second element compartment arranged transversely.

a first camera assembly located in the first element compartment;

a second camera assembly located in the second element compartment;

wherein, a front side of the first element compartment is provided with a first panel sealingly installed, and the first panel is provided with a first lens window, through which the lens field of view of the first camera assembly is exposed in an upward inclined manner;

a front side of the second element compartment is provided with a second panel sealingly installed, and the second panel is provided with a second lens window, through which the lens field of view of the second camera assembly is exposed in an upward inclined manner; and the lens field of view of the first camera assembly intersects with the lens field of view of the second camera assembly.

Based on the above embodiments, the camera device adopts a dual-lens configuration including the first camera assembly and the second camera assembly, wherein the lens field of view of the first camera assembly and the lens field of view of the second camera assembly are intersected, so as to form a layout mode that double areas on both sides of the camera device are photographed in a staggered manner, thereby avoiding the occurrence of a blind area between the lens view fields of the first camera assembly and the second camera assembly and improving the overall photographing range of the camera device.

BRIEF DESCRIPTION OF THE DRAWINGS

In order to more clearly describe the technical solutions of the embodiments of the present application and of the prior art, drawings that need to be used in embodiments and the prior art will be briefly described below. Obviously, the drawings provided below are for only some embodiments of the present application, those skilled in the art can also obtain other drawings based on these drawings without any creative efforts.

Figure 1:
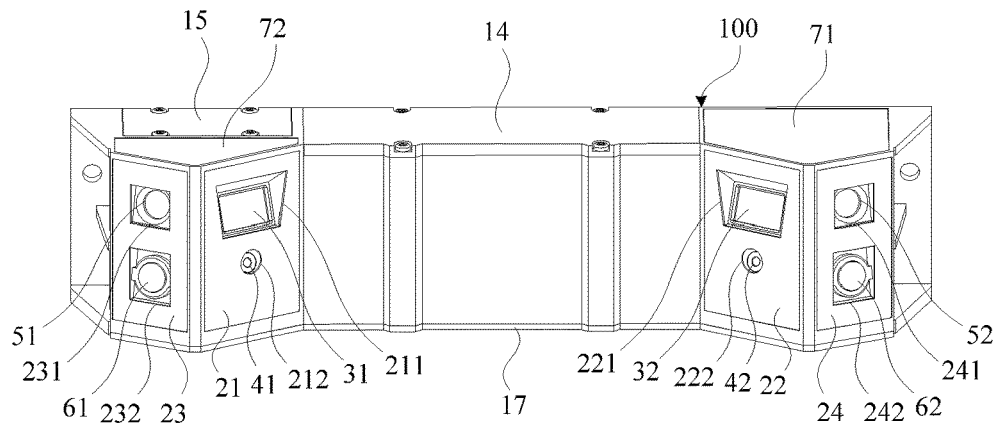
FIG. 1 is a schematic structural diagram of a camera device for collecting vehicle information in an assembled state according to an embodiment of the present application.

DESCRIPTION OF REFERENCE SIGNS 10 a camera device
100 a housing
11 a first element compartment
110 a maintenance opening
12 a second element compartment
13 a battery compartment
130 a battery exchanging port
14 a removable cover plate
15 a maintenance cover plate
16 a cover plate sealing ring
17 a bottom plate
18 a bottom plate sealing ring
19 a waterproof power connector
190 a cable through hole 21 a first panel
210 a first panel sealing ring
211 a first lens window
   211a a first transparent window glass
   211b a first window sealing ring
   211c a first window pressing block
212 a first light inlet window
213 a first supporting inclined column
22 a second panel
220 a second panel sealing ring
221 a second lens window
   221a a second transparent window glass
   221b a second window sealing ring
   221c a second window pressing block
222 a second light inlet window
223 a second supporting inclined column
23 a third panel
230 a third panel sealing ring
231 a first light outlet window
   231a a first light-transmitting baffle
   231b a first baffle sealing ring
   231c a first baffle pressing block
232 a first detection window
233 a first installation inclined column
235 a first pressing strip
236 a first surrounding frame
239 a first inclined frame
24 a fourth panel
240 a fourth panel sealing ring
241 a first light outlet window
   241a a second light-transmitting baffle
   241b a second baffle sealing ring
   241c a second baffle pressing block
242 a second detection window
243 a second installation inclined column
245 a second pressing strip
246 a second surrounding frame
249 a second inclined frame
31 a first camera assembly
310 a lens field of view of the first camera assembly
32 a second camera assembly
320 a lens field of view of the second camera assembly
41 a first photosensitive element
42 a second photosensitive element
51 a first light supplementing element
52 a second light supplementing element
61 a first target detection element
62 a second target detection element
70 a circuit module
70a a module mounting board
70b a circuit board
71, 72 waterproof antennas
710, 720 lead through holes
80 an exchangeable dry battery module
800 a waterproof terminal connector
81 a package housing
82 a package cover plate
83 a single dry battery
90 kerb
90a a first parking space
90b a second parking space
91 a first vehicle
910 a first license plate
92 a second vehicle
920 a second license plate

DETAILED DESCRIPTION

In order to make the objectives, technical solutions and advantages of the present application more apparent, the present application will further be described in detail bellow with reference to the drawings and the embodiments. Obviously, the described embodiments are only a part, not all, of the embodiments of the present application. Based on the embodiments in the present application, all other embodiments obtained by those skilled in the art without any creative efforts fall within the scope of protection of the present application.

Figure 2:
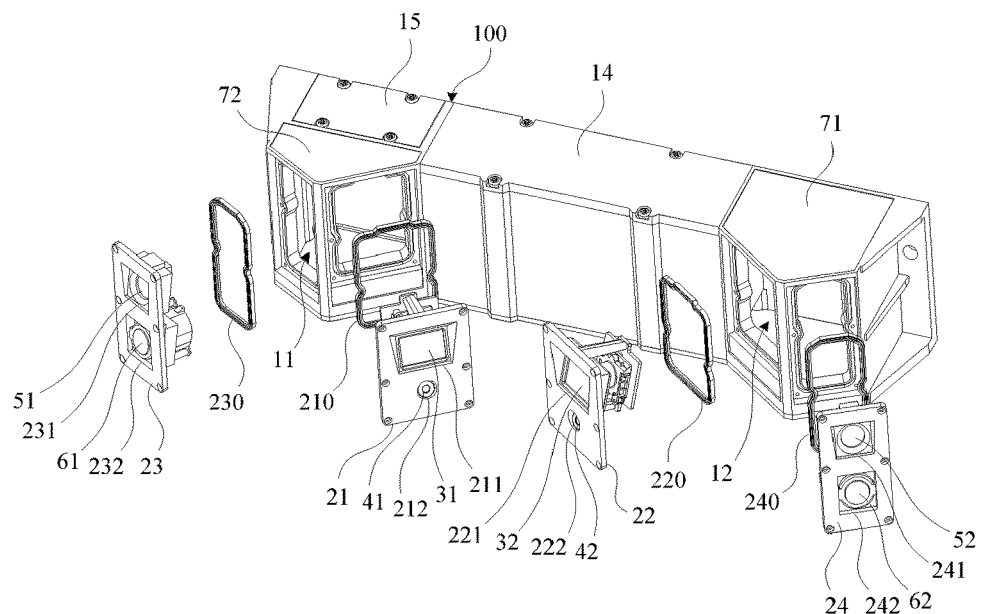
FIG. 2 is a schematic structural diagram of a panel part of the camera device shown in FIG. 1 in an exploded state.
Figure 3:
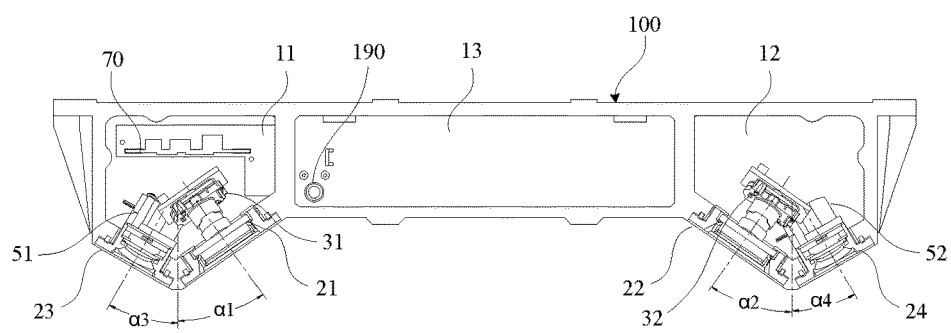
FIG. 3 is a schematic diagram illustrating element distribution in the camera device shown in FIG. 1.

FIG. 1 is a schematic structural diagram of a camera device for collecting vehicle information in an assembled state according to an embodiment of the present application. FIG. 2 is a schematic structural diagram of a panel part of the camera device shown in FIG. 1 in an exploded state. FIG. 3 is a schematic diagram illustrating element distribution in the camera device shown in FIG. 1. The camera device for collecting vehicle information according to an embodiment of the present application is suitable to be installed at a position (for example, a side of a kerb) that has little influence on vehicles and pedestrians.

Referring to FIG. 1 and in combination with FIGS. 2 and 3, in this embodiment, the camera device 10 for collecting vehicle information includes a housing 100, a first camera assembly 31 and a second camera assembly 32.

Referring to FIGS. 2 and 3, it can be clearly seen that the housing 100 is provided with a first element compartment 11 and a second element compartment 12 arranged transversely. The element compartment refers to an incompletely sealed compartment for arranging elements inside. A front side of the element compartment is provided with an opening, and the front side refers to the side facing a scene to be photographed. Taking an application scene where the camera device is installed on the kerb and used for photographing vehicles as an example, the front side refers to a side facing away from the kerb and facing towards the vehicle. Exemplarily, the element compartment may be a cube-shaped hollow compartment, and an opening is arranged on one side facing the scene to be photographed. The first camera assembly 31 is located in the first element compartment 11, and the second camera assembly 32 is located in the second element compartment 12.

Referring to FIG. 1 and FIG. 2, the front side of the first element compartment 11 is provided with a first panel 21 installed sealingly (for example, by a first panel sealing ring 210). The first panel 21 may be installed sealingly at the opening on the front side of the first element compartment 11. Exemplarily, a flange assembly is arranged at the opening on the front side of the first element compartment 11, and the first panel 21 also includes a flange assembly. A sealing ring may be arranged between the opening of the first element compartment 11 and the first panel 21, and the sealing ring may be pressed by abutting the flange assemblies on the first element compartment 11 and the first panel 21, so that the first panel 21 is sealingly installed on the first element compartment 11.

The first panel 21 may also be sealingly installed on the opening on the front side of the first element compartment 11 in cooperation with other components. The first panel 21 is provided with a first lens window 211, through which the lens field of view of the first camera assembly 31 is exposed in an upward inclined manner, wherein the exposure in an upward inclined manner means that an axis of the lens field of view passes through the first lens window 211 and inclines away from the ground. Similarly, the front side of the second element compartment 12 is provided with a second panel 22 installed sealingly (for example, by a second panel sealing ring 220). The second panel 22 is provided with a second lens window 221, through which the lens field of view of the second camera assembly 32 is exposed in an upward inclined manner. In addition, the lens field of view of the first camera assembly 31 intersects with the lens field of view of the second camera assembly 32. The sealing installation described herein can be understood as that all the linear or hole-shaped assembly gaps are sealed such as with filled glue, that is, the sealing for all the linear or hole-shaped assembly gaps that are not limited to the sealing ring, which will not be described in detail later.

The above intersection of the lens fields of view may refer to an intersecting manner in which the lens fields of view of the first camera assembly 31 and the second camera assembly 32 are intersected in opposite directions in upward inclined postures, wherein the intersection in opposite directions means the axes of the two lens fields of view intersect in opposite directions along which they extend.

As shown in FIG. 3, the first panel 21 and the second panel 22 are inclinedly arranged facing each other, that is, the first panel 21 and the second panel 22 are inclined inward facing each other. For example, the first panel 21 is inclined horizontally by a preset first horizontal inclination angle α1 toward a side where the second panel 22 is located, wherein the horizontal inclination refers to the inclination when the plane angle with the horizontal plane is kept unchanged. The second panel 22 is inclined horizontally by a preset second horizontal inclination angle α2 toward a side where the first panel 21 is located, wherein the first horizontal inclination angle α1 and the second horizontal inclination angle α2 may be reverse angles with equal absolute values or reverse angles with different absolute values.

Figure 4A:
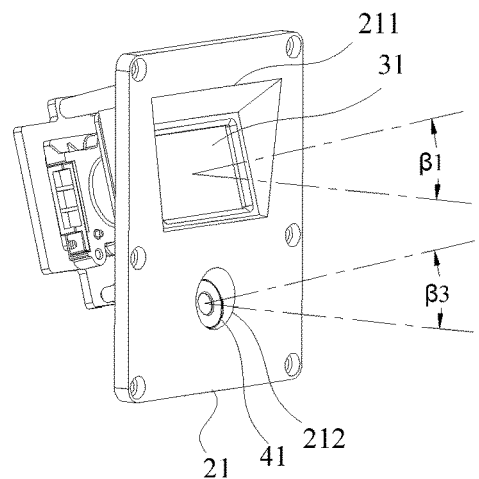
FIGS. 4a and 4b are schematic diagrams illustrating modularized inward inclined panels of the camera device shown in FIG. 1.
Figure 4B:
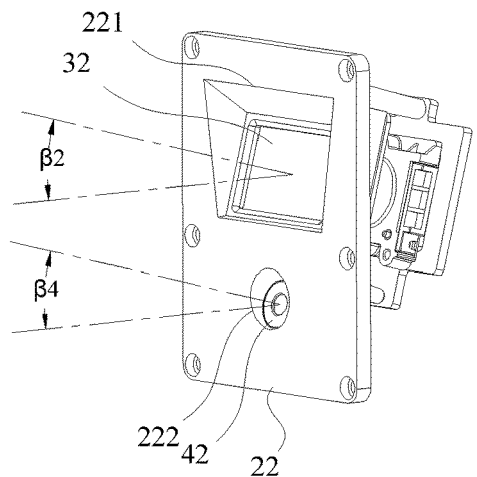
Figure 5A:
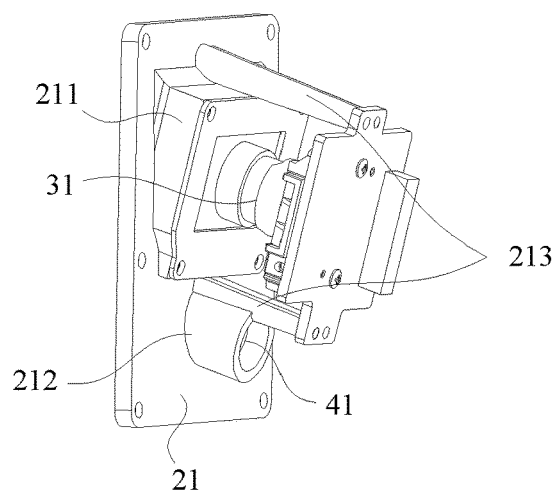
FIGS. 5a and 5b are schematic structural diagrams of the modularized inward inclined panels of the camera device shown in FIG. 1 in an assembled state.
Figure 5B:
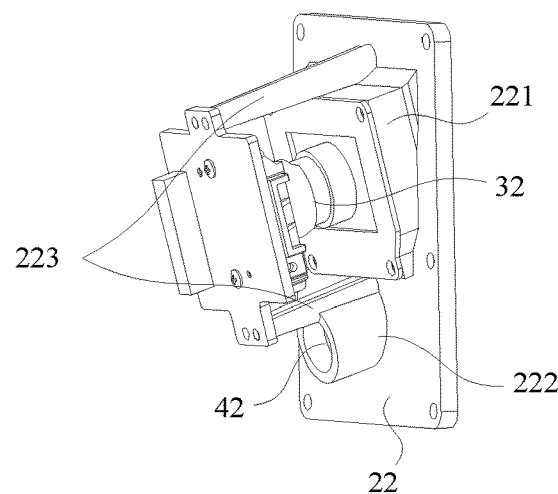
Figure 6A:
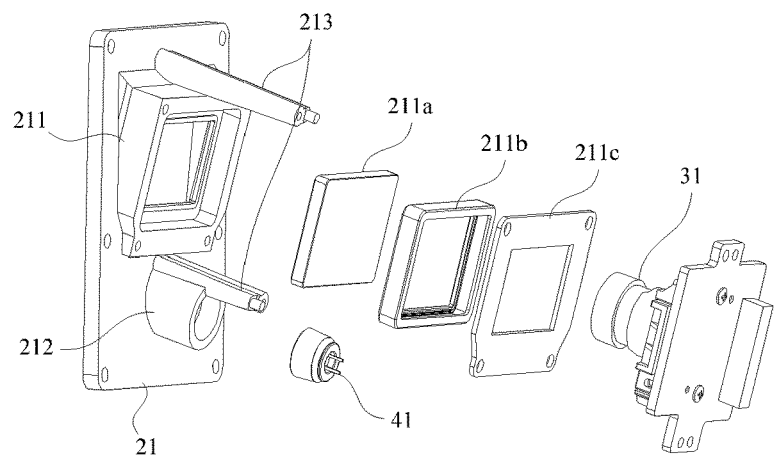
FIGS. 6a and 6b are schematic structural diagrams of the modularized inward inclined panels of the camera device shown in FIG. 1 in an exploded state.
Figure 6B:
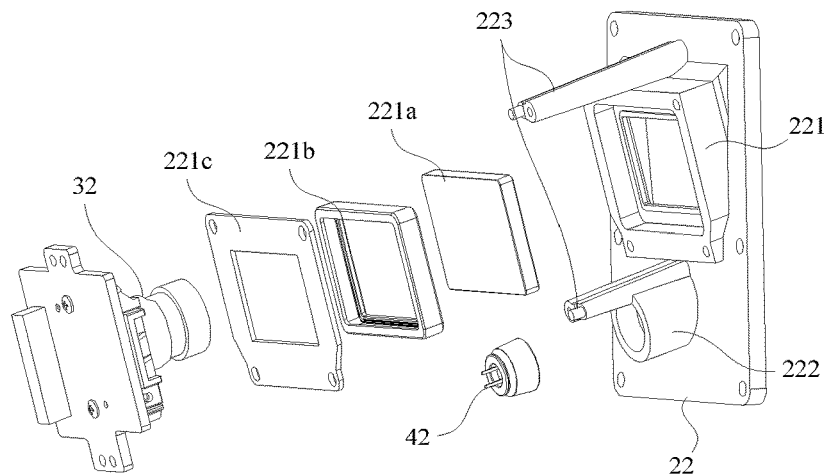

FIG. 4a and FIG. 4b are schematic diagrams illustrating the modularized inward inclined panels of the camera device shown in FIG. 1, wherein the inward inclined panel in FIG. 4a is the first panel 21 and the inward inclined panel in FIG. 4b is the second panel 22. FIG. 5a and FIG. 5b are schematic structural diagrams of the modularized inward inclined panels of the camera device shown in FIG. 1 in an assembled state, wherein the inward inclined panel in FIG. 5a is the first panel 21 and the inward inclined panel in FIG. 5b is the second panel 22. FIG. 6a and FIG. 6b are schematic structural diagrams of the modularized inward inclined panels of the camera device shown in FIG. 1 in an exploded state, wherein the inward inclined panel in FIG. 6a is the first panel 21 and the inward inclined panel in FIG. 6b is the second panel 22.

Referring to FIG. 4a and in combination with FIG. 3, the first lens window 211 may be inclined upward and recessed inwardly in the first panel 21, that is, the first lens window 211 may be inclined upward by a first longitudinal inclination angle β1 relative to the horizontal direction, and the first camera assembly 31 may be installed on the first panel 21 and take the first lens window 211 as an orientation reference of the lens field of view, so as to form a modularized structure with the first panel 21 as a carrier. Wherein, taking the first lens window 211 as an orientation reference of the lens field of view refers to taking a normal direction of the first lens window 211 as the orientation of the axis of the lens field of view. For example, as shown in FIG. 5a and FIG. 6a, the first camera assembly 31 may be suspendedly supported by a first supporting inclined column 213 inside the first panel 21 in a posture in which the lens field of view is oriented towards the first lens window 211, wherein the inside refers to a side of the first panel 21 facing the first element compartment 11. Suspending may refer to suspending the first camera assembly 31 on the first supporting inclined column 213, so that the first camera assembly 31 is fixed only under the support of the first supporting inclined column 213. For example, the first camera assembly 31 may be provided with at least two connecting components (such as threaded holes, clamping grooves, etc.), each of which is connected to corresponding connecting component on the first supporting inclined column 213, so that the first camera assembly 31 is suspendedly supported by the first supporting inclined column 213. A first transparent window glass 211a (e.g., a glass plate) may be embedded in the first lens window 211, that is, the first transparent window glass 211a is embedded in a hollow part of the first lens window 211. The outer periphery of the first transparent window glass 211a may be sealingly engaged with the first lens window 211 through a first window sealing ring 211b, and the first transparent window glass 211a and the first window sealing ring 211b may be pressed and sealed in the first lens window 211 by a first window pressing block 211c (e.g., a hollow glass block), that is, the first window pressing block 211c presses the first transparent window glass 211a and the first window sealing ring 211b towards the inner side of the first panel 21, so that the first transparent window glass 211a and the first window sealing ring 211b are limited in the first lens window 211.

In this way, as the first panel 21 inclines horizontally toward the side where the second panel 22 is located, the lens field of view of the first camera assembly 31 is inclined by the first horizontal inclination angle α1 toward the side where the second panel 22 is located. Further, as the first lens window 211 inclines upward relative to the first panel 21, the lens field of view of the first lens window 211 also inclines upward by the first longitudinal inclination angle β1.

Referring to FIG. 4b and in combination with FIG. 3, the second lens window 221 may be inclined upward and recessed inwardly in the second panel 22, that is, the second lens window 221 may be inclined upward by the second longitudinal inclination angle β2 relative to the horizontal direction, and the second camera assembly 32 may be installed on the second panel 22 and take the second lens window 221 as an orientation reference of the lens field of view, so as to form a modularized structure with the second panel 22 as a carrier. For example, as shown in FIG. 5b and FIG. 6b, the second camera assembly 32 may be suspendedly supported by a second supporting inclined column 223 inside the second panel 22 in a posture in which the lens field of view is oriented towards the second lens window 221. That is, the second camera assembly 32 assumes a posture in which the lens field of view is oriented towards the second lens window 221 under the support of the second supporting inclined column 223 inside the second panel 22. A second transparent window glass 221a (e.g., a glass plate) may be embedded in the second lens window 221. The outer periphery of the second transparent window glass 221a may be sealingly engaged with the second lens window 221 through a second window sealing ring 221b, and the second transparent window glass 221a and the second window sealing ring 221b may be pressed and sealed in the second lens window 221 by a second window pressing block 221c (e.g., a hollow glass block).

Therefore, as the second panel 22 inclines horizontally toward the side where the first panel 21 is located, the lens field of view of the second camera assembly 32 is inclined by the second horizontal inclination angle α2 toward the side where the second panel 22 is located. Further, as the second lens window 221 inclines upward relative to the second panel 22, the lens field of view of the second lens window 221 also inclines upward by the second longitudinal inclination angle β2.

Based on the above arrangement, the lens field of view of the first camera assembly 31 and the lens field of view of the second camera assembly 32 are intersected in opposite directions in upward inclined postures.

Figure 7:
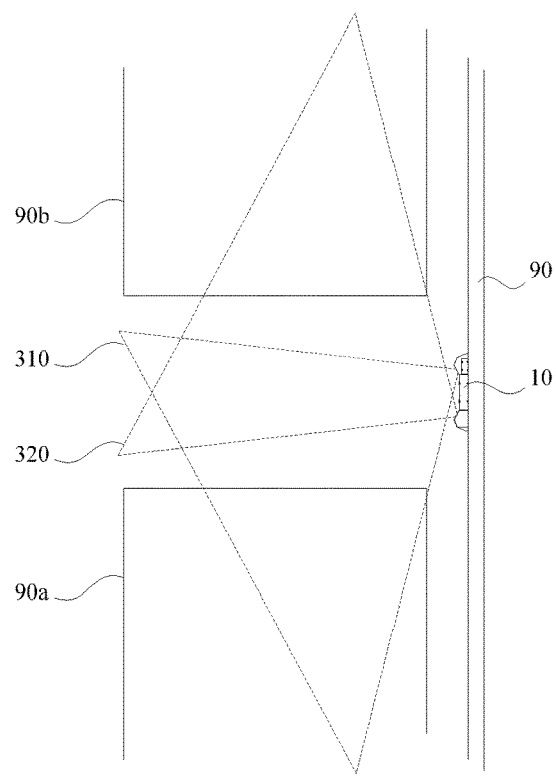
FIG. 7 is an example diagram of the camera device shown in FIG. 1 in a use state.

FIG. 7 is an example diagram of the camera device shown in FIG. 1 in a use state. Referring to FIG. 7, the camera device 10 shown in FIG. 1 may be arranged at a side of a kerb 90, and the camera device 10 arranged at the side of the kerb 90 may be located at the junction of two adjacent parking spaces. Since the lens field of view 310 of the first camera assembly 31 and the lens field of view 320 of the second camera assembly 32 intersect in upward inclined postures, the lens field of view 310 of the first camera assembly 31 can cover a first parking space 90a adjacent to a side of the second camera assembly 32, while the lens field of view 320 of the second camera assembly 32 can cover a second parking space 90b adjacent to a side of the first camera assembly 31. The lens field of view 310 of the first camera assembly 31 and the lens field of view 320 of the second camera assembly 32 can also overlap with each other to cover an interval area between the first parking space 90a and the second parking space 90b, so as to avoid the present of a photographing blind area in the interval area.

Figure 8A:
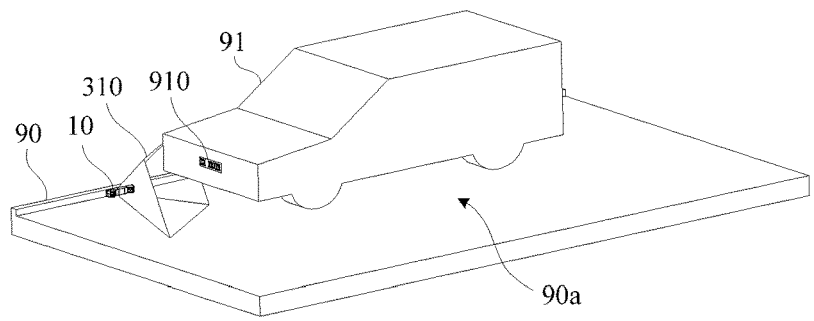
FIGS. 8a and 8b are schematic diagrams illustrating the distribution of lens field of view based on the use state example shown in FIG. 7.
Figure 8B:
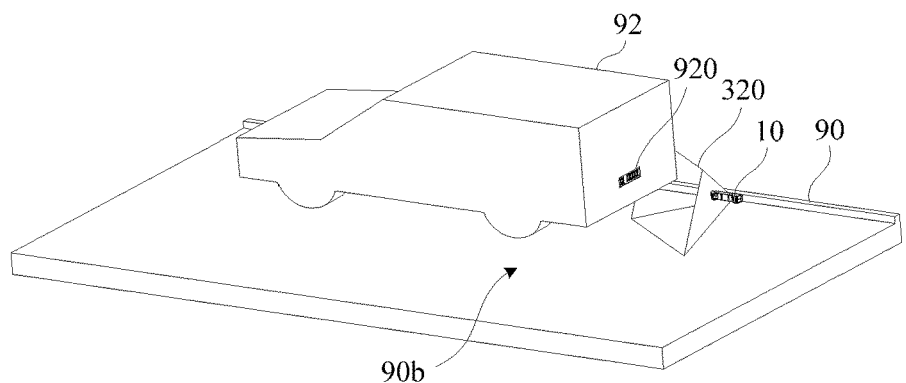
Figure 9A:
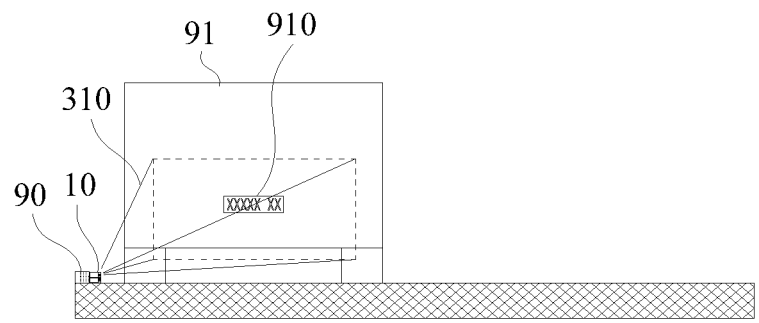
FIGS. 9a and 9b are schematic diagrams illustrating positions covered by the field of view based on the distribution of the lens field of view as shown in FIGS. 8a and 8b.
Figure 9B:
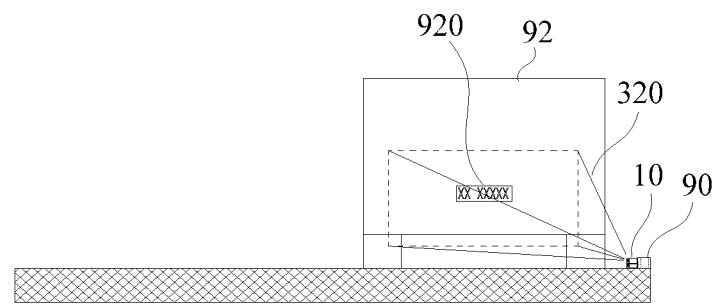

FIGS. 8a and 8b are schematic diagrams illustrating the distribution of the lens field of view based on the use state example shown in FIG. 7. FIGS. 9a and 9b are schematic diagrams illustrating positions covered by the field of view based on the distribution of the lens field of view as shown in FIGS. 8a and 8b.

With reference to FIG. 7 and FIG. 8a and FIG. 9a, when a first vehicle 91 is parked in the first parking space 90a, the lens field of view 310 of the first camera assembly 31 can capture the image of a license plate 910 installed on the head of the first vehicle 91. Even if there is a deviation in the parking position of the first vehicle 91, so that the head of the vehicle is located in the interval area between the first parking space 90a and the second parking space 90b, its license plate 910 can still be covered by the lens field of view 310 of the first camera assembly 31 and/or the lens field of view 320 of the second camera assembly 32. Therefore, it can be ensured that the image of the license plate 910 of the first vehicle 91 parked in a right or offset position in the first parking space 90a can be captured, and vehicle information of the first vehicle 91 can be acquired from the captured image.

With reference to FIG. 7 and FIG. 8b and FIG. 9b, when a second vehicle 92 is parked in the second parking space 90b, the lens field of view 320 of the second camera assembly 32 can capture the image of a license plate 920 installed at the rear of the second vehicle 92. Even if there is a deviation in the parking position of the second vehicle 92, so that the rear of the vehicle is located in the interval area between the first parking space 90a and the second parking space 90b, its license plate 920 can still be covered by the lens field of view 320 of the second camera assembly 32 and/or the lens field of view 310 of the first camera assembly 31. Therefore, it can be ensured that the image of the license plate 920 of the second vehicle 92 parked in a right or offset position in the second parking space 90b can be captured, and vehicle information of the second vehicle 92 can be acquired from the captured image.

According to the above embodiments, the camera device 10 adopts a dual-lens configuration including the first camera assembly 31 and the second camera assembly 32, wherein the lens field of view 310 of the first camera assembly 31 and the lens field of view 320 of the second camera assembly 32 are intersected, so as to form a layout mode in which two areas on both sides of the camera device 10 are photographed in a staggered manner, thus avoiding the occurrence of a blind area between the lens fields of view of the first camera assembly 31 and the second camera assembly 32 and improving the overall photographing range of the camera device 10.

Referring to FIGS. 1 to 3, the camera device 10 may further include a first photosensitive element 41 located in the first element compartment 11 and a second photosensitive element 42 located in the second element compartment 12. Wherein the first photosensitive element 41 may be used to acquire illumination environment parameters in the lens field of view 310 of the first camera assembly 31, and the second photosensitive element 42 may be used to acquire illumination environment parameters in the lens field of view 320 of the second camera assembly 32. Based on the acquired illumination environment parameters, a processor (not shown in the figure) in the camera device 10 can adjust exposure parameters of the first camera assembly 31 and the second camera assembly 32 to a value that matches the ambient brightness, which is beneficial to improve the quality of image photographing.

Correspondingly, the first panel 21 may also be provided with a first light inlet window 212, the second panel 22 may be provided with a second light inlet window 222, and the first light inlet window 212 may be located below the first lens window 211, i.e., closer to the ground than the first lens window. The second light inlet window 222 is located below the second lens window 221. The first photosensitive element 41 may be exposed through the first light inlet window 212 in an upward inclined manner, and the sensing range of the first photosensitive element 41 overlaps with the lens field of view of the first camera assembly 31. Similarly, the second photosensitive element 42 may be exposed through the second light inlet window 222 in an upward inclined manner, and the sensing range of the second photosensitive element 42 overlaps with the lens field of view of the second camera assembly 32.

Referring specifically to FIGS. 1 to 3 and FIGS. 4a, 5a, and 6a, the first light inlet window 212 may be inclined upward and recessed inwardly in the first panel 21, that is, the first light inlet window 212 may be inclined upward by a third longitudinal inclination angle β3 relative to the horizontal direction, and the first photosensitive element 41 may be embedded in the first light inlet window 212.

In such a way, as the first panel 21 inclines horizontally toward the side where the second panel 22 is located, the sensing range of the first photosensitive element 41 inclines by the first horizontal inclination angle α1 at the same side as the lens field of view 310 of the first camera assembly 31. Further, as the first light inlet window 212 inclines upward in the first panel 21, the sensing range of the first photosensitive element 41 inclines upward by the third longitudinal inclination angle β3. In practical applications, the third longitudinal inclination angle β3 may be set to be the same as the first longitudinal inclination angle β1 by which the first camera assembly 31 inclines upward. Alternatively, the deviation between the third longitudinal inclination angle β3 and the first longitudinal inclination angle β1 within a preset tolerance range may be allowed on the premise of ensuring that the sensing range of the first photosensitive element 41 overlaps with the lens field of view of the first camera assembly 31.

In the same way, referring to FIGS. 1 to 3 and FIGS. 4b, 5b and 6b, the second light inlet window 222 may be inclined upward and recessed inwardly in the second panel 22, that is, the second light inlet window 222 may be inclined upward by a fourth longitudinal inclination angle β4 relative to the horizontal direction, and the second photosensitive element 42 is embedded in the second light inlet window 222.

In such a way, as the second panel 22 inclines horizontally toward the side where the first panel 21 is located, the sensing range of the second photosensitive element 42 inclines by the second horizontal inclination angle α2 at the same side as the lens field of view 320 of the second camera assembly 32. Further, as the second light inlet window 222 inclines upward in the second panel 22, the sensing range of the second photosensitive element 42 inclines upward by the fourth longitudinal inclination angle β4. In practical applications, the fourth longitudinal inclination angle β4 may be set to be the same as the second longitudinal inclination angle β2 by which the second camera assembly 32 inclines upward. Alternatively, the deviation between the fourth longitudinal inclination angle β4 and the second longitudinal inclination angle β2 within a preset tolerance range may be allowed on the premise of ensuring that the sensing range of the second photosensitive element 42 overlaps with the lens field of view of the second camera assembly 32.

In addition, the first light inlet window 212 in which the first photosensitive element 41 is embedded and the second light inlet window 212 in which the second photosensitive element 42 is embedded can be sealed with filled glue, that is, the first photosensitive element 41 and the first light inlet window 212 are sealed together and the second photosensitive element 42 and the second light inlet window 212 are sealed together with filled glue.

It can be understood that any one of FIGS. 1 to 3 and 4a, 4b, 5a, 5b, 6a and 6b is only a possible schematic structural diagram of the camera device or components in the camera device according to the embodiment of the present application, to which the camera device according to the embodiment of the present application is not limited.

For example, in one possible embodiment, the camera device further includes a first photosensitive element 41 located in the first element compartment 11 and a second photosensitive element 42 located in the second element compartment 12, wherein a panel of the first element compartment 11 other than the first panel 21 is further provided with a first light inlet window 212, and the sensing range of the first photosensitive element 41 overlaps with the lens field of view of the first camera assembly 31. In addition, a panel of the second element compartment 12 other than the second panel 22 is further provided with a second light inlet window 222, and the sensing range of the second photosensitive element 42 overlaps with the lens field of view of the second camera assembly 32.

A panel other than the first panel 21 can refer to any panel except the first panel 21, and can refer to different panels according to different actual requirements. Similarly, a panel other than the second panel 22 can refer to any panel except the second panel 22, and can refer to different panels according to different actual requirements. The panel herein can refer to a surface having an arbitrary shape of the camera device.

Referring to FIGS. 1 to 3, the camera device 10 may further include a first light supplementing element 51 located in the first element compartment 11 and a second light supplementing element 52 located in the second element compartment 12.

Correspondingly, the front side of the first element compartment 11 may be provided with a third panel 23 installed sealingly (for example, by a third panel sealing ring 230), that is, the front side of the first element compartment 11 is sealingly installed with the third panel 23 and the first panel 21, and the third panel 23 and the first panel 21 together realize the sealing of the front side of the first element compartment 11. The third panel 23 may be located at a side farther away from the second element compartment 12 than the first panel 21. For example, if the second element compartment 12 is located on the right side of the first element compartment 11 and an opening exists in the front surface of the first element compartment 11, the first panel 21 may be sealingly installed on a right half of the opening and the third panel 23 may be sealingly installed on a left half of the opening.

The third panel 23 may be provided with a first light outlet window 231, to which the first light supplementing element 51 may be exposed in an upward inclined manner. Furthermore, the illumination range of the first light supplementing element 51 may overlap with the lens field of view of the second camera assembly 32, so as to supplement light when the ambient brightness of the lens field of view of the second camera assembly 32 is too low, so as to improve the quality of images captured by the second camera assembly 32.

Similarly, the front side of the second element compartment 12 may be further provided with a fourth panel 24 installed sealingly (e.g., by a fourth panel sealing ring 240), which may be located at a side farther away from the first element compartment 11 than the second panel 22. The fourth panel 24 may be provided with a second light outlet window 241, to which the second light supplementing element 52 may be exposed in an upward inclined manner. Furthermore, the illumination range of the second light supplementing element 52 may overlap with the lens field of view of the first camera assembly 31, so as to supplement light when the ambient brightness of the lens field of view of the first camera assembly 31 is too low, so as to improve the quality of images captured by the first camera assembly 31.

For example, the processor in the camera device 10 may:
turn on the second light supplementing element 52 in response to the ambient brightness detected by the first photosensitive element 41 being lower than a preset first brightness threshold;
turn off the second light supplementing element 52 in response to the ambient brightness detected by the first photosensitive element 41 reaching the preset first brightness threshold;
turn on the first light supplementing element 51 in response to the ambient brightness detected by the second photosensitive element 42 being lower than a preset second brightness threshold;
turn off the first light supplementing element 51 in response to the ambient brightness detected by the second photosensitive element 42 reaching the preset second brightness threshold.

Referring to FIG. 3, the third panel 23 and the fourth panel 24 are inclinedly arranged opposite to each other, i.e., the third panel 23 and the fourth panel 24 are inclined outward opposite to each other. Specifically, the third panel 23 may be arranged inclinedly in a direction converging to the lens field of view of the second camera assembly 32, for example, the third panel 23 inclines horizontally by a preset third horizontal inclination angle α3 in a direction converging to the lens field of view of the second camera assembly 32. Similarly, the fourth panel 24 may be arranged inclinedly in a direction converging to the lens field of view of the first camera assembly 31, for example, the fourth panel 24 inclines horizontally by a preset fourth horizontal inclination angle α4 in a direction converging to the lens field of view of the first camera assembly 31. The third horizontal inclination angle α3 and the fourth horizontal inclination angle α4 may be reverse angles with equal absolute values or reverse angles with different absolute values.

Figure 10A:
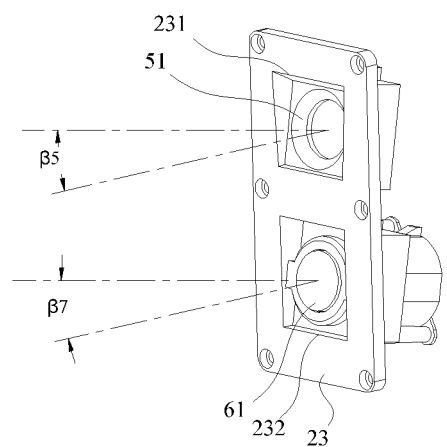
FIG. 10a and FIG. 10b are schematic diagrams illustrating the modularized outward inclined panels of the camera device shown in FIG. 1.
Figure 10B:
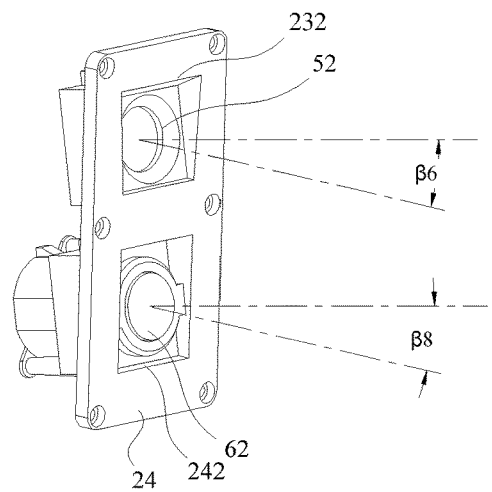
Figure 11A:
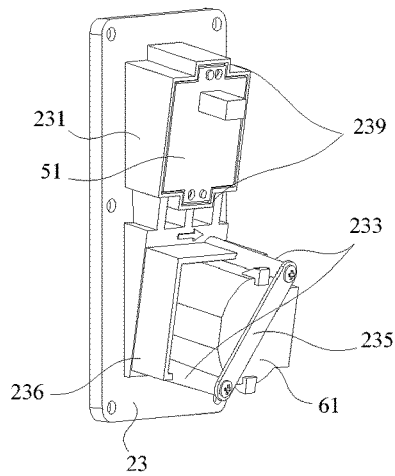
FIG. 11a and FIG. 11b are schematic structural diagrams of the modularized outward inclined panels of the camera device shown in FIG. 1 in an assembled state.
Figure 11B:
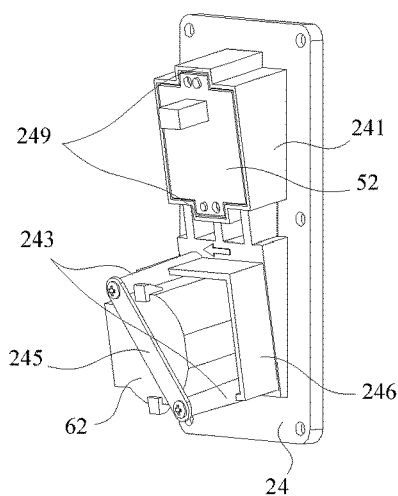
Figure 12A:
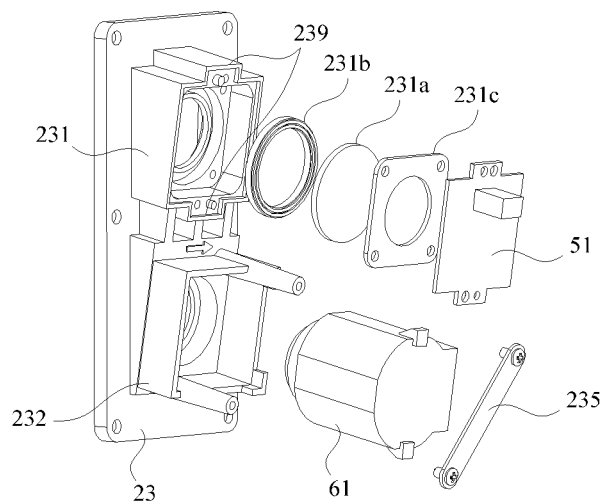
FIG. 12a and FIG. 12b are schematic structural diagrams illustrating the modularized outward inclined panels of the camera device shown in FIG. 1 in an exploded state.
Figure 12B:
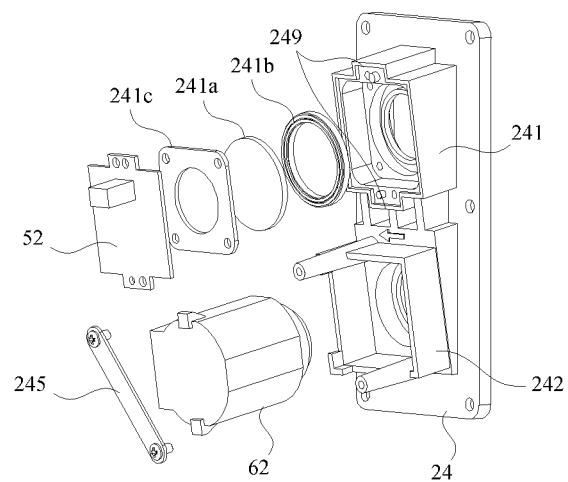

FIG. 10a and FIG. 10b are schematic diagrams illustrating the modularized outward inclined panel of the camera device shown in FIG. 1. FIG. 11a and FIG. 11b are schematic structural diagrams of the modularized outward inclined panels of the camera device shown in FIG. 1 in an assembled state. FIG. 12a and FIG. 12b are schematic structural diagrams illustrating the modularized outward inclined panels of the camera device shown in FIG. 1 in an exploded state.

Referring to FIG. 10a and in combination with FIG. 3, the first light outlet window 231 can be inclined upward and recessed inwardly in the third panel 23, that is, the first light outlet window 231 can be inclined upward by a fifth longitudinal inclination angle β5 relative to the horizontal direction, and the first light supplementing element 51 may be installed on the third panel 23 and take the first light outlet window 231 as an orientation reference of the light exit direction, so as to form a modularized structure with the third panel 23 as a carrier. For example, as shown in FIG. 11a and FIG. 12a, the first light supplementing element 51 may be supported by a first inclined frame 239 surrounding the first light outlet window 231 inside the third panel 23 in a posture in which a light exit surface is oriented towards the first light outlet window 231. A first light-transmitting baffle 231a may be embedded in the first light outlet window 231, and may be a light-transmitting baffle made of different light-transmitting materials according to application scenarios, such as a transparent plastic sheet. The outer periphery of the first light-transmitting baffle 231a may be sealingly engaged with the first light outlet window 231 through a first baffle sealing ring 231b, and the first light-transmitting baffle 231a and the first baffle sealing ring 231b may be pressed and sealed in the first light outlet window 231 by a first baffle pressing block 231c (the first baffle pressing block 231b may be a block structure made of different materials, such as a hollow plastic plate).

In this way, as the third panel 23 inclines horizontally in a direction converging to the lens field of view of the second camera assembly 32, the illumination range of the first light supplementing element 51 converges to the lens field of view of the second camera assembly 32 by the third horizontal inclination angle α3. Further, as the first light outlet window 231 inclines upward in the third panel 23, the illumination range of the first light supplementing element 51 also inclines upward by the fifth longitudinal inclination angle β5.

Referring to FIG. 10b and in combination with FIG. 3, the second light outlet window 241 may be inclined upward and recessed inwardly in the fourth panel 24, that is, the second light outlet window 241 can be inclined upward by a sixth longitudinal inclination angle β6 relative to the horizontal direction, and the second light supplementing element 52 may be installed on the fourth panel 24 and take the second light outlet window 241 as an orientation reference of the light exit direction, so as to form a modularized structure with the third panel 23 as a carrier. For example, as shown in FIGS. 11b and 12b, the second light supplementing element 52 may be supported by a second inclined frame 249 surrounding the second light outlet window 241 inside the fourth panel 24 in a posture in which a light exit surface is oriented towards the second light outlet window 241, and a second light-transmitting baffle 241a may be embedded in the second light outlet window 241, which may be a light-transmitting baffle made of different light-transmitting materials according to application scenarios, such as a transparent plastic sheet. The outer periphery of the second light-transmitting baffle 241a may be sealingly engaged with the second light outlet window 241 through a second baffle sealing ring 241b, and the second light-transmitting baffle 241a and the second baffle sealing ring 241b may be pressed and sealed in the second light outlet window 241 by a second baffle pressing block 241c (the second baffle pressing block 241b may be a block structure made of different materials, such as a hollow plastic plate).

In this way, as the fourth panel 24 inclines horizontally in a direction converging to the lens field of view of the first camera assembly 31, the illumination range of the second light supplementing element 52 converges to the lens field of view of the first camera assembly 31 by the fourth horizontal inclination angle α4. Further, as the second light outlet window 241 inclines upward in the fourth panel 24, the illumination range of the second light supplementing element 52 also inclines upward by the sixth longitudinal inclination angle β6.

Referring to FIGS. 1 to 3, the camera device 10 may further include a first target detection element 61 located in the first element compartment 11 and a second target detection element 62 located in the second element compartment 12. Wherein, the first target detection element 61 and the second target detection element 62 may be components with target detection capability, such as radars. The first target detection element 61 may be used to detect targets suspected to be vehicles appearing in the lens field of view of the second camera assembly 32, while the second target detection element 62 may be used to detect targets suspected to be vehicles appearing in the lens field of view of the first camera assembly 31. For example, the processor in the camera device 10 may:

turn on the second camera assembly 32 in response to a target occurrence event detected by the first target detection element 61;

turn off the second camera assembly 32 in response to a target disappearance event detected by the first target detection element 61;

turn on the first camera assembly 31 in response to a target occurrence event detected by the second target detection element 62;

turn off the first camera assembly 31 in response to a target disappearance event detected by the second target detection element 62.

Correspondingly, the third panel 23 may be provided with a first detection window 232, and the fourth panel 24 may be further provided with a second detection window 242. Furthermore, the first detection window 232 may be located below the first light outlet window 231 and the second detection window 242 may be located below the second light outlet window 241. The first target detection element 61 may be arranged in the first detection window 232 in an upward inclined manner, and the detection range of the first target detection element 61 overlaps with the lens field of view of the second camera assembly 32. Similarly, the second target detection element 62 may be arranged in the second detection window 242 in an upward inclined manner, and the detection range of the second target detection element 62 may overlap with the lens field of view of the first camera assembly 31.

Referring specifically to FIGS. 1-3 in combination with FIGS. 10a, 11a and 12a, the first detection window 232 may be inclined upward and recessed inwardly in the third panel 23, that is, the first detection window 232 may be inclined upward by a seventh longitudinal inclination angle β7 relative to the horizontal direction, and the first target detection element 61 may be installed on the third panel 23 and take the first detection window 232 as an orientation reference of the detection range, so as to form a modularized structure with the third panel 23 as a carrier. For example, as shown in FIGS. 11a and 12a, the first target detection element 61 may block the first detection window 232, and may be pressed against the first detection window 232 by a first pressing strip 235 installed on a first installation inclined column 233 inside the third panel 23. Furthermore, the inner side of the third panel 23 may be provided with a first surrounding frame 236 surrounding the first detection window 232, and the first detection element 61 and the first surrounding frame 236 may be sealed with filled glue.

In this way, as the third panel 23 inclines horizontally in a direction converging to the lens field of view of the second camera assembly 32, the detection range of the first target detection element 61 converges to the lens field of view of the second camera assembly 32 by the third horizontal inclination angle α3. Further, as the first detection window 232 inclines upward in the third panel 23, the illumination range of the first target detection element 61 also inclines upward by the seventh longitudinal inclination angle β7. In practical applications, the seventh longitudinal inclination angle β7 may be set to be the same as or different from the first longitudinal inclination angle β1 of the first camera assembly 31 on the premise of ensuring that the detection range of the first target detection element 61 overlaps with the lens field of view of the second camera assembly 32.

Referring specifically to FIGS. 1-3 in combination with FIGS. 10b, 11b and 12b, the second detection window 242 may be inclined upward and recessed inwardly in the fourth panel 24, that is, the second detection window 242 may be inclined upward by an eighth longitudinal inclination angle β8 relative to the horizontal direction, and the second target detection element 62 may be installed on the fourth panel 24 and take the second detection window 242 as an orientation reference of the detection range, so as to form a modularized structure with the fourth panel 24 as a carrier. For example, as shown in FIGS. 11b and 12b, the second target detection element 62 may block the second detection window 242, and may be pressed against the second detection window 242 by a second pressing strip 245 installed on a second installation inclined column 243 inside the fourth panel 23. Furthermore, the inner side of the fourth panel 24 may be provided with a second surrounding frame 246 surrounding the fourth detection window 242, and the second detection element 62 and the second surrounding frame 246 may be sealed with glue.

In this way, as the fourth panel 24 inclines horizontally in a direction converging to the lens field of view of the first camera assembly 31, the detection range of the second target detection element 62 converges to the lens field of view of the first camera assembly 31 by the fourth horizontal inclination angle α4. Further, as the second detection window 242 inclines upward in the fourth panel 24, the illumination range of the second target detection element 62 also inclines upward by the eighth longitudinal inclination angle β8. In practical applications, the eighth longitudinal inclination angle β8 may be set to be the same as or different from the second longitudinal inclination angle β2 of the second camera assembly 32 on the premise of ensuring that the detection range of the second target detection element 62 overlaps with the lens field of view of the first camera assembly 31.

It can be understood that the above description of the positions of the first detection window 232, the first light outlet window 231, the second detection window 242 and the second light outlet window 241 is made based on only one possible structure for the camera device according to the embodiments of the present application. The camera device according to the embodiment of the present application may also adopt different structures according to different application scenarios.

For example, in one possible embodiment, the camera device further includes a first light supplementing element 51 and a first target detection element 61 located in the first element compartment 11 and a second light supplementing element 52 and a second target detection element 62 located in the second element compartment 12. Further, one panel of the first element compartment 11 is provided with a first light outlet window 231, and the other panel of the first element compartment 11 is provided with a first detection window 232. The light exit surface of the first light supplementing element 51 is exposed to the first light outlet window 231 in an upward inclined manner, and a detection end of the first target detection element 61 is arranged in the first detection window 232 in an upward inclined manner, the illumination range of the first light supplementing element 51 and the detection range of the first target detection element 61 overlap with the lens field of view of the second camera assembly 32.

In addition, one panel of the second element compartment 12 is provided with a second light outlet window 241, and the other panel of the second element compartment is provided with a second detection window 242. The light exit surface of the second light supplementing element 52 is exposed to the second light outlet window 241 in an upward inclined manner, and a detection end of the second target detection element 62 is arranged in the second detection window 242 in an upward inclined manner, the illumination range of the second light supplementing element 52 and the detection range of the second target detection element 62 overlap with the lens field of view of the first camera assembly 31.

One panel of the first element compartment 11 and the other panel of the first element compartment refer to two different panels for sealing the first element compartment 11, and any one of the one panel and the other panel may be the aforementioned first panel 21 or the aforementioned third panel 23, and the one panel and the other panel may refer to different panels according to different application scenarios. For example, in one possible embodiment, the one panel may be the aforementioned first panel 21, and the other panel may be the aforementioned third panel 23. In another possible embodiment, the one panel and the other panel may also be two panels other than the aforementioned first panel 21 and aforementioned third panel 23.

Similarly, one panel of the second element compartment 12 and the other panel of the first element compartment refer to two different panels for sealing the second element compartment 12, and any one of the one panel and the other panel may be the aforementioned second panel 22 or the aforementioned fourth panel 24.

The first and second photosensitive elements 41 and 42, the first and second light supplementing elements 51 and 52, and the first and second target detection elements 61 and 62 that can be introduced into the camera device 10 are respectively used to realize photosensitive detection, light supplementing and target detection. In practical applications, auxiliary functions of photosensitive detection, light supplementing and target detection are not functions that the camera device 10 must have. Moreover, even if the auxiliary functions are considered, the camera device 10 does not have to have all the additional functions of photosensitive detection, light supplementing and target detection, but can only introduce at least one of them.

However, as long as the camera device 10 is introduced with at least one auxiliary function such as photosensitive detection, light supplementing, and target detection, the quality of image photographing and/or the accuracy of photographing moment can be improved, thereby facilitating improving the accuracy of vehicle information collection.

Figures 13, 14:
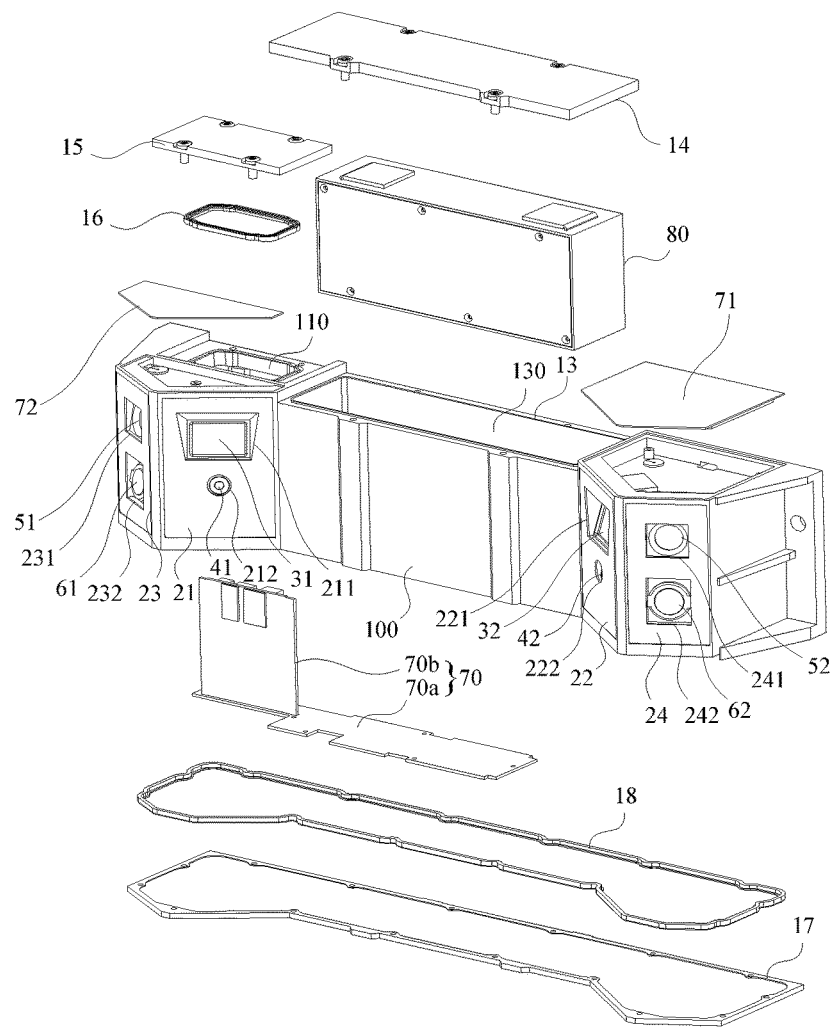
FIG. 13 is a schematic structural diagram of the camera device shown in FIG. 1 with fittings shown in an exploded state.
FIG. 14 is a schematic diagram of the camera device shown in FIG. 1 with fittings in suspension.

FIG. 13 is a schematic structural diagram of the camera device shown in FIG. 1 with fittings shown in an exploded state. FIG. 14 is a schematic diagram of the camera device shown in FIG. 1 with fittings shown in suspension. Referring to FIGS. 13 and 14, the housing 100 may be provided with a battery compartment 13, for example, the battery compartment 13 may be arranged between the first element compartment 11 and the second element compartment 12. The camera device 10 may further include an exchangeable dry battery module 80 accommodated in the battery compartment 13, and the top of the battery compartment 13 may be provided with a battery exchanging port 130 which is sealed and covered by a removable cover plate 14. The battery compartment 13 may be provided with a waterproof power connector 19, and the exchangeable dry battery module 80 may be provided with a waterproof terminal connector 800 inserted into the waterproof power connector 19. A cable connected to the waterproof power connector 19 is led out through a cable through hole 190 of the battery compartment 13, and the cable through hole 190 may be sealed by dispensing glue.

Figure 15:
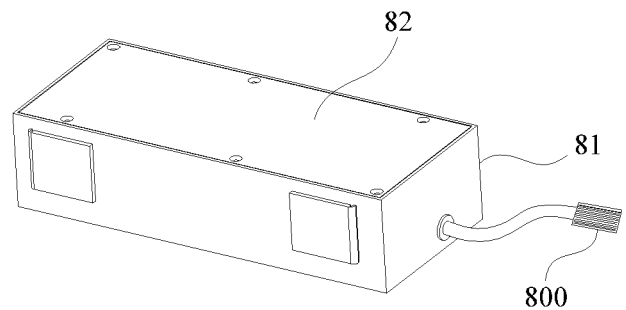
FIG. 15 is a schematic structural diagram of a dry battery module shown in FIGS. 13 and 14.
Figure 16:
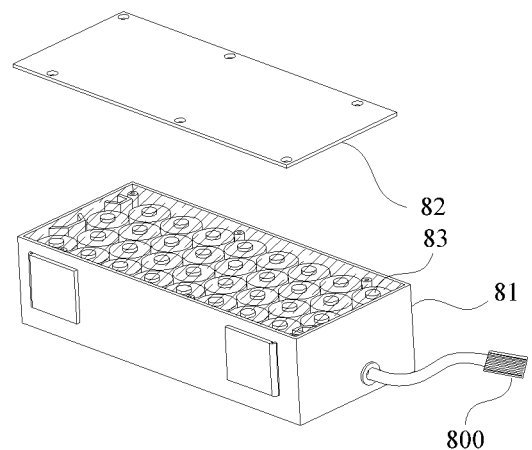
FIG. 16 is a schematic structural diagram of the dry battery module shown in FIG. 15 in an exploded state.
Figure 17:
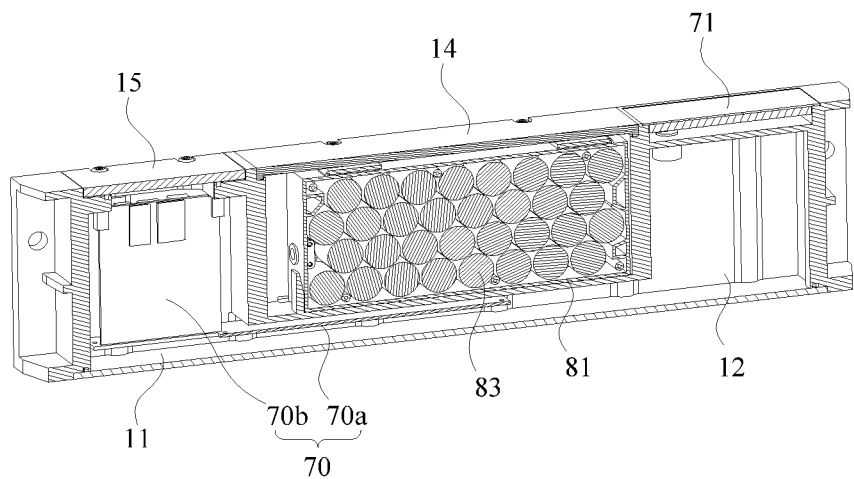
FIG. 17 is a sectional view of the camera device shown in FIG. 1.

FIG. 15 is a schematic structural diagram of the dry battery module shown in FIGS. 13 and 14. FIG. 16 is a schematic structural diagram of the dry battery module shown in FIG. 15 in an exploded state. FIG. 17 is a sectional view of the camera device shown in FIG. 1. Referring to FIGS. 15 to 17, the exchangeable dry battery module 80 in the present embodiment may be provided with a sealed package, that is, the exchangeable dry battery module 80 includes a package housing 81, and a plurality of single dry batteries 83 accommodated in the package housing 81 and sealingly covered by a package cover plate 82, and gaps between the single dry batteries 83 in the package housing 81 are sealed with filled glue.

Based on the power supply of all components in the camera device 10 by the exchangeable dry battery module 80, the camera device 10 can save the cable connection, which is convenient for the use and maintenance of the camera device, and can also avoid complicated municipal and electric construction. Moreover, in terms of battery power supply, the dry battery module 80 does not need the lighting conditions required by solar cells, and usually has a wider applicable temperature range than rechargeable batteries (for example, some dry battery modules may stably discharge in a temperature range of −30° C. to 70° C.). In other possible embodiments, the battery compartment 13 may also be provided with other energy storage modules besides dry battery modules, such as lithium battery modules, which are not limited in this embodiment.

Referring to FIG. 13, the housing 100 may be further provided with a bottom plate 17, which can seal and cover the bottoms of the first element compartment 11, the second element compartment 12 and the battery compartment 13 through a bottom plate sealing ring 18. Furthermore, the camera device 10 may further include a circuit module 70 accommodated in the first element compartment 11, and the circuit module 70 is electrically connected to the exchangeable dry battery module 80. For example, the circuit module 70 may include a module mounting board 70a and a circuit board 70b, wherein the module mounting board 70a extends horizontally below the battery compartment 13, the module mounting board 70a is installed at the bottom of the battery compartment 13 and is electrically connected to the exchangeable dry battery module 80, and the circuit board 70b in the first element compartment 11 is vertically installed on the module mounting board 70a.

Referring to FIG. 13 and FIG. 14, the camera device 10 may further include waterproof antennas 71 and 72 arranged outside the housing 100, and the waterproof antennas 71 and 72 are communicatively connected to the circuit module 70. In addition, lead wires of the waterproof antennas 71 and 72 may be introduced into the housing 100 through lead through holes 710 and 720 respectively, and the lead through holes 710 and 720 may be sealed by dispensing glue.

Based on the above structure, the camera device 10 can support wireless transmission based on the antennas 71 and 72 (for example, wireless transmission of 4G or 5G), so that network wiring can be omitted. In this embodiment, the antenna 71 is configured as a main antenna and the antenna 72 is configured as a sub-antenna 71 as an example. The main antenna 71 may be arranged above the top plate of the second element compartment 12, and the sub-antenna 72 may be arranged above the top plate of the first element compartment 11. Further, the top of the first element compartment 11 may be provided with a maintenance opening 110 sealed and covered by a maintenance cover plate 15 through a cover plate sealing ring 16, and the sub-antenna 72 avoids the maintenance cover plate 15. Alternatively, the antennas 71 and 72 (i.e., the main antenna 71 and the sub-antenna 72) may also be fixed on the front side wall of the battery compartment 13.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A camera device for collecting vehicle information, wherein the camera device comprises:
   a housing (100) having a first element compartment (11) and a second element compartment (12) arranged transversely;
   a first camera assembly (31) located in the first element compartment (11);
   a second camera assembly (32) located in the second element compartment (12);
   wherein a front side of the first element compartment (11) is provided with a first panel (21) sealingly installed, the first panel (21) is provided with a first lens window (211), through which a lens field of view of the first camera assembly (31) is exposed in an upward inclined manner;

a front side of the second element compartment (12) is provided with a second panel (22) sealingly installed, the second panel (22) is provided with a second lens window (221), through which a lens field of view of the second camera assembly (32) is exposed in an upward inclined manner; and the lens field of view of the first camera assembly (31) intersects with the lens field of view of the second camera assembly (32), wherein the lens field of view of the first camera assembly (31) covers a first parking space adjacent to a side of the second camera assembly (32), and the lens field of view of the second camera assembly (32) covers a second parking space adjacent to a side of the first camera assembly (31), and the lens field of view of the first camera assembly (31) and the lens field of view of the second camera assembly (32) overlap with each other to cover an interval area between the first parking space and the second parking space.

2. The camera device according to claim 1, wherein the first panel (21) and the second panel (22) are inclinedly arranged facing each other;

the first lens window (211) is inclined upward and recessed inwardly in first panel (21), the first camera assembly (31) is installed on the first panel (21) and takes the first lens window (211) as an orientation reference of the lens field of view, the second lens window (221) is inclined upward and recessed inwardly in the second panel (22), the second camera assembly (32) is installed on the second panel (22) and takes the second lens window (221) as an orientation reference of the lens field of view.

3. The camera device according to claim 2, wherein the first camera assembly (31) is suspendedly supported by a first supporting inclined column (213) inside the first panel (21) in a posture in which the lens field of view of the first camera assembly is oriented towards the first lens window (211), a first transparent window glass (211a) is embedded in the first lens window (211), an outer periphery of the first transparent window glass (211a) is sealingly engaged with the first lens window (211) through a first window sealing ring (211b), and the first transparent window glass (211a) and the first window sealing ring (211b) are pressed and sealed in the first lens window (211) by a first window pressing block (211c);

the second camera assembly (32) is suspendedly supported by a second supporting inclined column (223) inside the second panel (22) in a posture in which the lens field of view of the second camera assembly is oriented towards the second lens window (221), a second transparent window glass (221a) is embedded in the second lens window (221), an outer periphery of the second transparent window glass (221a) is sealingly engaged with the second lens window (221) through a second window sealing ring (221b), and the second transparent window glass (221a) and the second window sealing ring (221b) are pressed and sealed in the second lens window (221) by a second window pressing block (221c).

4. The camera device according to claim 1, wherein the camera device further comprises a first photosensitive element (41) located in the first element compartment (11) and a second photosensitive element (42) located in the second element compartment (12), wherein the first panel (21) is further provided with a first light inlet window (212), through which a photosensitive surface of the first photosensitive element (41) is exposed in an upward inclined manner, and a sensing range of the first photosensitive element (41) overlaps with the lens field of view of the first camera assembly (31); and the second panel (22) is further provided with a second light inlet window (222), through which a photosensitive surface of the second photosensitive element (42) is exposed in an upward inclined manner, and a sensing range of the second photosensitive element (42) overlaps with the lens field of view of the second camera assembly (32).

5. The camera device according to claim 4, wherein, the first light inlet window (212) is located below the first lens window (211);

the second light inlet window (222) is located below the second lens window (221).

6. The camera device according to claim 4, wherein, the first light inlet window (212) is inclined upward and recessed inwardly in the first panel (21), and the first photosensitive element (41) is embedded in the first light inlet window (212);

the second light inlet window (222) is inclined upward and recessed inwardly in the second panel (22), and the second photosensitive element (42) is embedded in the second light inlet window (222).

7. The camera device according to claim 6, wherein the first light inlet window (212) in which the first photosensitive element (41) is embedded and the second light inlet window (212) in which the second photosensitive element (42) is embedded are sealed with filled glue.

8. The camera device according to claim 1, wherein the camera device further comprises a first photosensitive element (41) located in the first element compartment (11) and a second photosensitive element (42) located in the second element compartment (12);

wherein a panel of the first element compartment (11) other than the first panel (21) is further provided with a first light inlet window (212), and a sensing range of the first photosensitive element (41) overlaps with the lens field of view of the first camera assembly (31); and a panel of the second element compartment (12) other than the second panel (22) is further provided with a second light inlet window (222), and a sensing range of the second photosensitive element (42) overlaps with the lens field of view of the second camera assembly (32).

9. The camera device according to claim 1, wherein the camera device further comprises a first light supplementing element (51) and/or a first target detection element (61) located in the first element compartment (11), and a second light supplementing element (52) and/or a second target detection element (62) located in the second element compartment (12).

10. The camera device according to claim 9, wherein the front side of the first element compartment (11) is further provided with a third panel (23) installed sealingly, which is located at a side farther away from the second element compartment (12) than the first panel (21);

when the first light supplementing element (51) is contained in the first element compartment (11), the third panel (23) is provided with a first light outlet window (231), to which the first light supplementing element (51) is exposed in an upward inclined manner, and an illumination range of the first light supplementing element (51) overlaps with the lens field of view of the second camera assembly (32);

when the first target detection element (61) is contained in the first element compartment (11), the third panel (23) is provided with a first detection window (232), in which the first target detection element (61) is arranged in an upward inclined manner, and a detection range of the first target detection element (61) overlaps with the lens field of view of the second camera assembly (32).

11. The camera device according to claim 9, wherein the front side of the second element compartment (12) is further provided with a fourth panel (24) installed sealingly, which is located at a side farther away from the first element compartment (11) than the second panel (22);

when the second light supplementing element (52) is contained in the second element compartment (12), the fourth panel (24) is provided with a second light outlet window (241), to which the second supplementing element (52) is exposed in an upward inclined manner, and an illumination range of the second light supplementing element (52) overlaps with the lens field of view of the first camera assembly (31);

when the second target detection element (62) is contained in the second element compartment (12), the fourth panel (24) is provided with a second detection window (242), in which the second target detection element (62) is arranged in an upward inclined manner, and a detection range of the second target detection element (62) overlaps with the lens field of view of the first camera assembly (31).

12. The camera device according to claim 1, further comprising an exchangeable dry battery module for supplying power to the camera device.

* * * * *